US007859537B2

(12) United States Patent
Hsu (10) Patent No.: US 7,859,537 B2
(45) Date of Patent: Dec. 28, 2010

(54) EVALUATION OF SELF-INTERSECTING VECTOR GRAPHICS OBJECTS VIA PLANAR MAP PROFILES

(75) Inventor: Siu Chi Hsu, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 11/626,330

(22) Filed: Jan. 23, 2007

(65) Prior Publication Data
US 2008/0174602 A1    Jul. 24, 2008

(51) Int. Cl.
*G06T 11/20* (2006.01)
(52) U.S. Cl. .................................... 345/441
(58) Field of Classification Search ............ 345/441
See application file for complete search history.

(56) References Cited
U.S. PATENT DOCUMENTS

| | | | |
|---|---|---|---|
| 4,989,152 A | 1/1991 | Cheng et al. | |
| 5,651,106 A * | 7/1997 | Ashburn | 345/441 |
| 6,271,861 B1 | 8/2001 | Sargent et al. | |
| 6,313,840 B1 | 11/2001 | Bilodeau et al. | |
| 6,373,490 B1 | 4/2002 | Bendiksen et al. | |
| 6,567,083 B1 | 5/2003 | Baum et al. | |
| 6,622,085 B1 | 9/2003 | Amita | |
| 6,724,383 B1 | 4/2004 | Herken et al. | |
| 6,784,896 B1 | 8/2004 | Perani et al. | |
| 6,922,193 B2 | 7/2005 | Ritter | |
| 7,038,697 B2 | 5/2006 | Gangnet et al. | |
| 7,102,636 B2 | 9/2006 | Reshetov et al. | |
| 7,123,269 B1 | 10/2006 | Bourdey et al. | |
| 2003/0160980 A1 | 8/2003 | Olsson | |
| 2006/0139369 A1 | 6/2006 | Zimmer et al. | |

FOREIGN PATENT DOCUMENTS

| | | | |
|---|---|---|---|
| JP | 2005122302 A | * | 5/2005 |
| KR | 1020030003148 | | 1/2003 |
| WO | WO2004/006166 A2 | | 1/2004 |

OTHER PUBLICATIONS

Floater, Michael. "Mean value coordinates," Mar. 2003, Computer Aided Geometric Design, vol. 20, pp. 19-27.*
Search Report Ref 319229.02, for Application No. PCT/US2008/051504, mailed Jun. 25, 2008.
Cabral, et al., "Imaging Vector Fields Using Line Integral Convolution", Proceedings of the 20th annual conference on Computer graphics and interactive techniques. Published 1993. pp. 263-270.
Conversy, et al., "The svgl toolkit: enabling fast rendering of rich 2D graphics", Technical Report 02/1/INFO, Ecole des Mines de Nantes (2002). 11 Pages.
Turk, "Texture Synthesis on Surfaces", ACM SIGGRAPH 2001, Aug. 12-17, 2001, Los Angeles, CA, USA. pp. 347-354.

\* cited by examiner

*Primary Examiner*—Ryan R Yang
(74) *Attorney, Agent, or Firm*—L. Alan Collins; Collins & Collins Incorporated

(57) ABSTRACT

Systems and methods for converting vector graphic object path profiles into planar map profiles for efficient mean value coordinates evaluation wherein the nodes of resultant region paths include a set of quantities of arbitrary dimension.

16 Claims, 6 Drawing Sheets

EVALUATION OF SELF-INTERSECTING VECTOR GRAPHICS OBJECTS VIA PLANAR MAP PROFILES

BACKGROUND

Vector graphics are typically based on geometric descriptions of shapes annotated with rendering attributes that control the appearance of the resulting graphics. For example, a geometric shape can be annotated with a reddish color to fill the interior area, and a bluish outline of 3 mm thick can be drawn along the boundary of the shape. Simple rendering attributes like these are generally effective only in creating bold designs. To introduce richness, one may increase the complexity of the composition with more graphics objects and more complex shapes. Another method to introduce richness is to augment the rendering attributes with information that allows variations to be introduced or adjusted in a controllable way. A gradient vector is one example of such variations that allow multiple colors and/or shades to be applied (radially, linearly, conically, etc.) across a shape. However, the kind of gradation that can be specified with a gradient vector is relatively simplistic and limited. More general ways to specify arbitrarily complex gradations are desirable.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide systems and methods for converting vector graphic object path profiles into planar map profiles for efficient mean value coordinates evaluation wherein the nodes of resultant region paths include a set of quantities of arbitrary dimension.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a vector graphics computing system, the system described is provided as an example and not a limitation. As those skilled in the art will appreciate, the present examples are suitable for application in a variety of different types of graphics and computing systems and the like.

Figure 1:
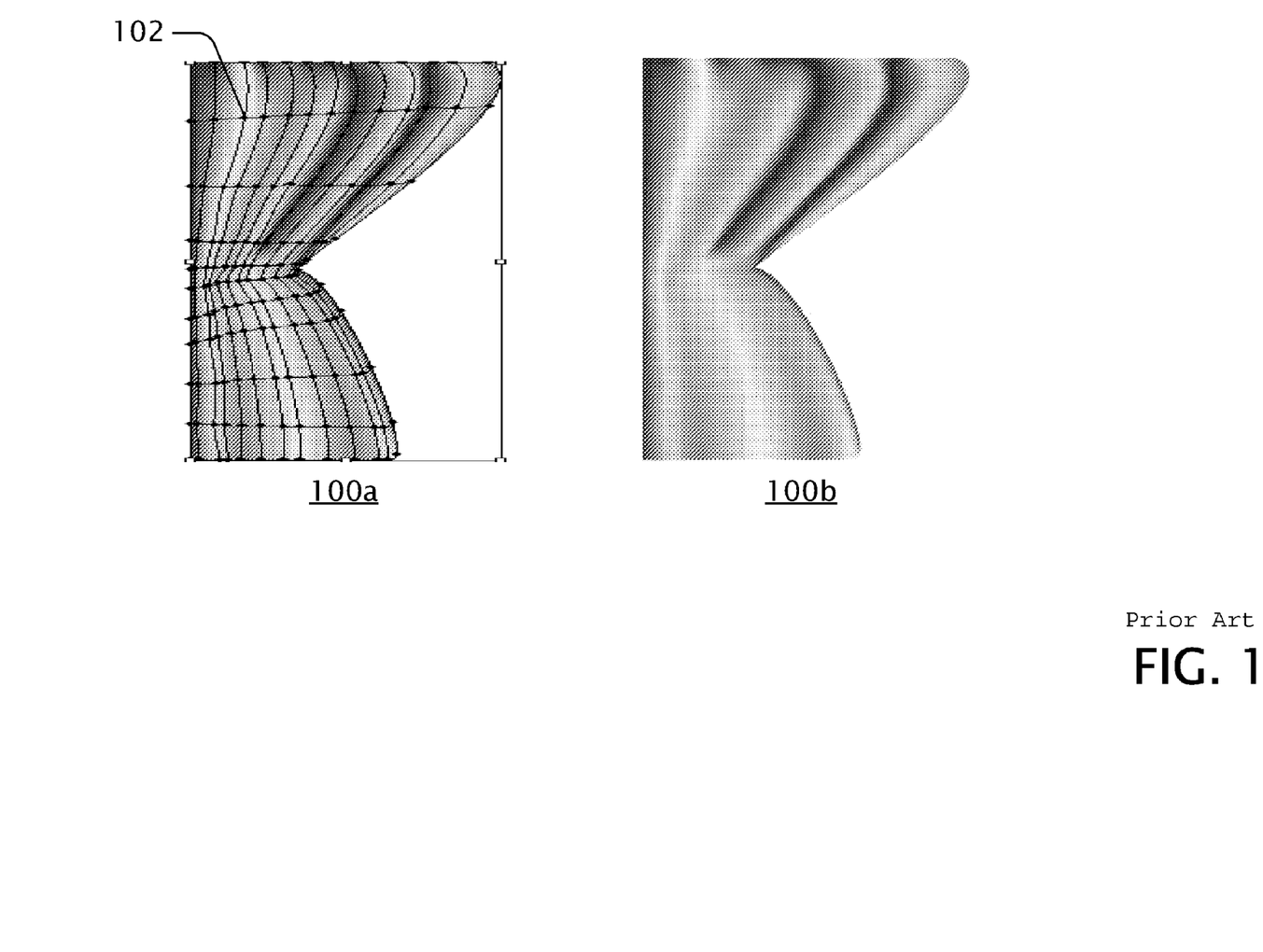
FIG. 1 is a diagram showing an image in two views, the image formed using a gradient mesh, as an example of the prior art.

FIG. 1 is a diagram showing an image in two views 100*a* and 100*b*, the image formed using a gradient mesh, as an example of the prior art. Image 100*a* shows the gradient mesh 102 overlaid on the image and image 100*b* is the same image without showing gradient mesh 102. Such a gradient mesh allows color information to be attached to each corner or vertex of each patch of the gradient mesh used to form the resulting shape. The colors are then smoothly interpolated across the patches two-dimensionally to create complex color variations. This approach generally requires complex meshes and color nodes to be introduced, and the gradient meshes are typically incompatible with the original shape geometry. The term "color node" as used herein generally refers to a point on a path, such as a corner of a gradient mesh, that is assigned specific color information.

Another example of the prior art is a path gradient brush, which uses a path plus a center point to control color interpolation. Such a path may represent a brush stroke, for example. The use of a path to lay down colors to be smoothly interpolated tends to be a more natural and intuitive method compared to using a gradient mesh, but the typical restriction that the interpolation is valid only within the interior of the color path is awkward and the rendering may be limited to color gradients.

Figure 2:
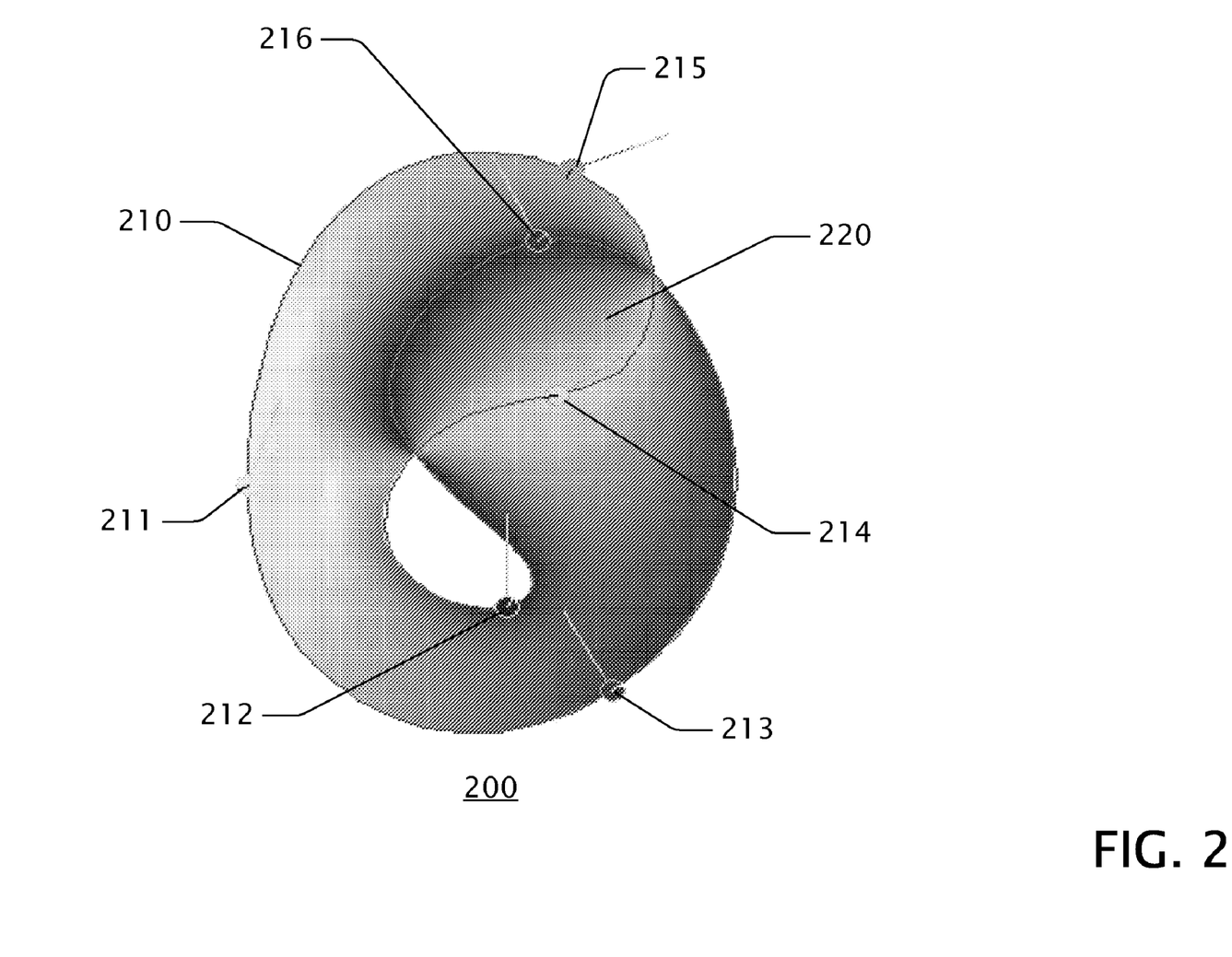
FIG. 2 is a diagram showing an image or vector graphics object formed using a path profile as an example of the prior art.

FIG. 2 is a diagram showing an image or vector graphics object 200 formed using a path profile. Image 200 utilizes a path as indicated by line 210 and the path profile quantities 211, 212, 213, 214, 215, and 216 attached to various positions or path profile nodes along path 210. In this example, two dimensional ("2D") quantities (a magnitude and a direction) are used wherein the magnitude controls brightness and the direction controls hue. Other characteristics could alternatively be controlled by the 2D quantities. Such path profile quantities are generally smoothly interpolated to create a vector field, such as example vector field 220. Arbitrary multi-dimensional quantities, typically with one or more dimension, may be used in general. The term "path profile" as used herein generally refers to a path, such as represented by a line or any other means, that defines, at least in part, a shape. A path profile also typically includes one or more "path profile nodes". The term "node" as used herein generally refers to some point on a path, such as a vertex, a control point, a fractional position on a path or sub-path, or any other point, the point including one or more value or quantities, each such quantity defining any desirable characteristic, including characteristics such as color, brightness, density, hue, direction of a hatch pattern, or the like. Thus the term "path profile" more generally refers to a set of quantities associated with the path and the nodes of the path.

The vector field defined from such a path profile will typically satisfy the following properties:

(1) Interpolation—the values of the vector field at the positions of the path profile nodes should be identical to the original nodes values;

(2) Smoothness—the vector field should be well defined and smooth for all positions not on the path itself;

(3) Linear precision—if all the path profile nodes have the same value, then the resulting vector field should have that value everywhere.

One example of the present invention is based on path interpolation, but instead of directly placing color values on the nodes of a path, a set of quantities of arbitrary dimensions is typically associated with nodes or fractional positions along the path or each sub-path in the case of a compound path. The set of quantities is then smoothly interpolated to create a vector field of dimensions equal to the dimensions of the attached quantities over the entire 2D plane, as opposed to being restricted to just the interior of the path. The resulting vector field can be used to directly or indirectly drive the rendering style of the image or vector graphics object.

Figure 3:
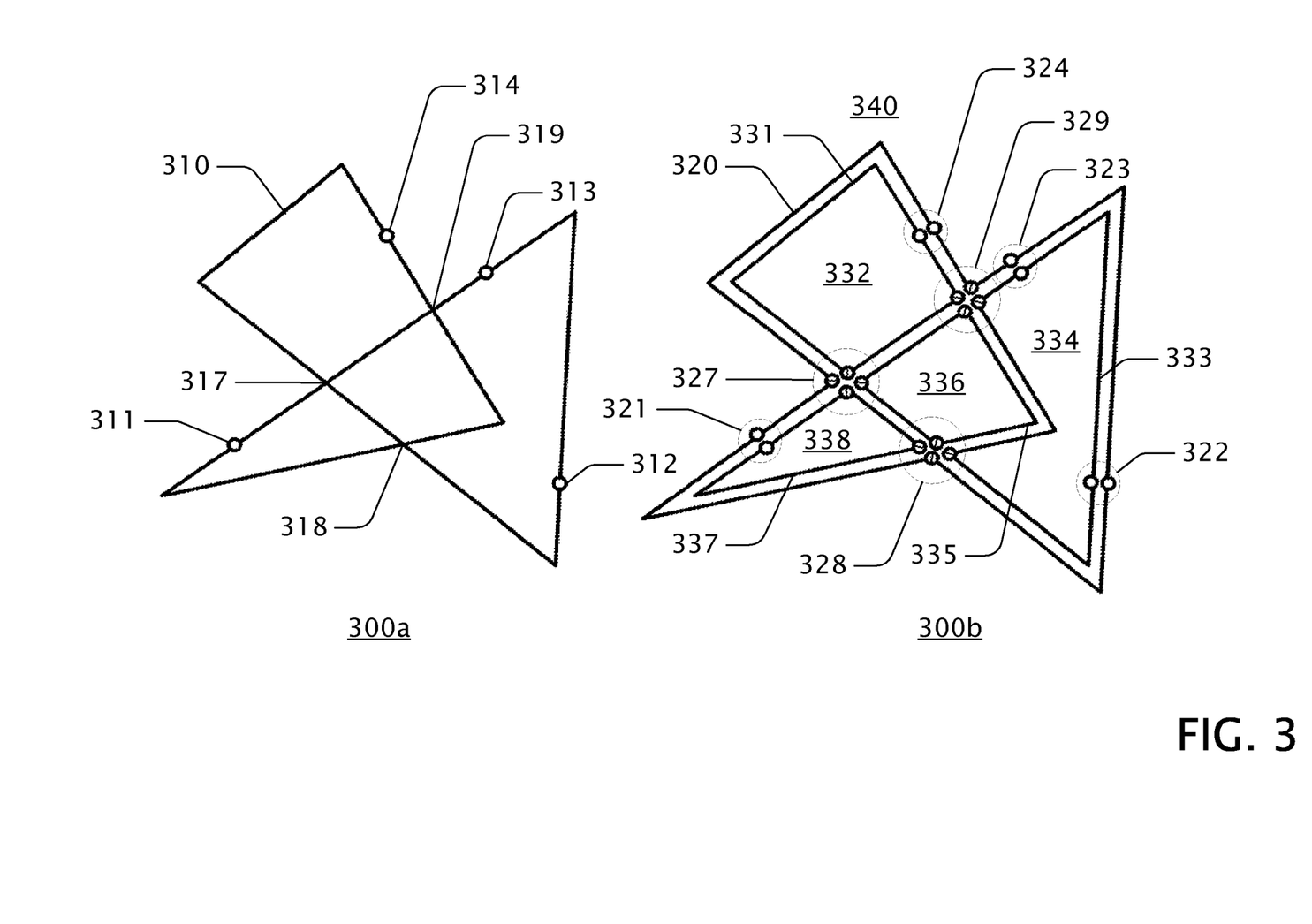
FIG. 3 is a diagram showing an example path profile and the same path profile converted into an example planar map profile.

FIG. 3 is a diagram showing an example path profile 300*a* and the same path profile 300*a* converted into an example planar map profile 300*b*. Path profile 300*a* is a self-intersecting path profile with path intersections 317, 318, and 319. Path profile 300*a* also includes example nodes 311, 312, 313, and 314 positioned at fractional positions along the path or segments of the path.

Generating a vector field from a path profile, such as example path profile 300*a*, may be accomplished using techniques based on the classical problem of polygon interpolation, the resulting vector field being generated from original nodes of the path, such as example nodes 311-314. The general approach is to solve a flow equation numerically with the original nodes and values being the boundary conditions. An issue with such a numerical evaluation technique is that it tends to be computationally intensive and that it typically has to start from the polygon edges and incrementally perform the computation up to the position to be evaluated. Techniques that can directly evaluate the field value at any position are desirable for flow tracing and the evaluation of the field at positions far from the original polygon. The term "field value" as used herein is associated with some position in a vector field and is generally the computed value for a specified position in the vector field. Such field values, values, or quantities may be multi-dimensional.

In order to provide a drawing application (such as a software graphics application or program) with the ability to generate a smooth field, one could employ a generalized Barycentric coordinates construction. Mean value coordinates ("MVC") is one such Barycentric coordinates construction that includes desirable properties such as would satisfy the interpolation, smoothness and linear precision properties described herein above. For example, MVC could be evaluated directly at any position on a 2D plane.

The MVC formulation defines the Barycentric interpolants Wi for each polygonal vertex $P_i$ for a point V on the 2D plane to be:

$$Wi=[\tan(A_{i-1}/2)+\tan(A_i/2)]/|P_i-V|$$

Where $A_i$ is the angle formed by the vector $P_i-V$ and $P_{i+1}-V$

Unfortunately, the MVC formulation breaks down on self-intersecting paths, and self-intersecting paths are commonly used in graphics compositions and designs. The present invention provides a solution to this problem.

In one example of the present invention the MVC technique may be applied by first converting a path profile, such as path profile 300*a*, into a planar map profile ("PMP"), such as PMP 300*b*. Such a conversion partitions the intersecting path profile 300*a* into planar map partitions where each planar map partition is a simply connection region with no intersections. For example, path profile 300*a* as defined in part by line 310 is converted to PMP 300*b*. Path line 320 of PMP 300*b* partitions the entire outer region 340 of PMP 300*b*. Path line 331 partitions region 332. Path line 333 partitions region 334. Path line 335 partitions region 336. And path line 337 partitions region 338. The path lines 320 and 331, 333, 335, and 337 represent corresponding region paths and form the regions or partitions of converted PMP 300*b*. Since each planar map partition is by definition a simply connected region, a mean value coordinates evaluation or the like can be performed as usual. The conversion of a path profile into a PMP also resolves the value discontinuity issue at the intersection points.

The region paths of the PMP are split at intersection points 327, 328, and 329. At each intersection, two different node values are generated and evaluated by interpolating along each of the two source path sections that contributed to the intersection. Then a double node or node pair is inserted at each intersection point, ordered such that the evaluation of the field values along each partitioned portion remains identical to that on the original path. Nodes positioned at fractional positions along a path or path segment are each similarly replaced with a double node or node pair, such as nodes 311-314 of the original path profile 300*a* being replaced with double nodes 321-324 of converted PMP 300*b*, with one node inserted on the path of each partition and ordered such that the evaluation of the field values along each partitioned portion remains identical to that on the original path.

Figure 4:
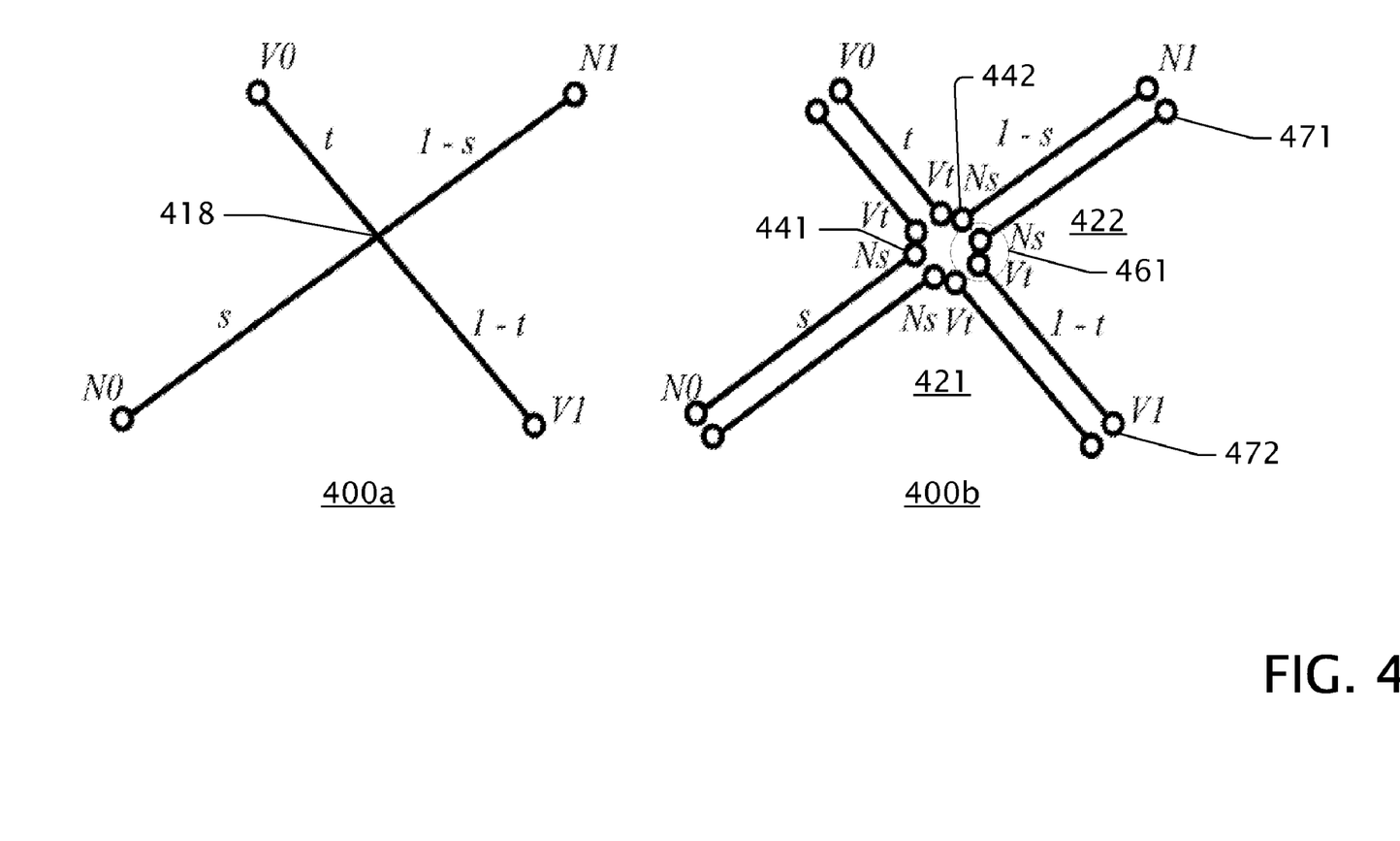
FIG. 4 is diagram showing an example path profile and a corresponding planar map profile for use in providing a detailed description of the computation and insertion of double nodes.

FIG. 4 is diagram showing an example path profile 300*b* and a corresponding planar map profile 400*b* for use in providing a detailed description of the computation and insertion of double nodes. Example path profile 400*a* is very basic-two intersecting lines-so as to simplify the following description. The method described also applies to path profiles of arbitrary complexity. In path profile 400*a*, consider two straight sub-paths or sections between path profile nodes N0, N1 and V0, V1 respectively. Assume that the intersection point 418 is at a fractional position s and t on the N0, N1 and V0, V1 sections respectively. The value at intersection point 418 along N0, N1 is designated Ns, as shown in 400*b*, which is simply the linear interpolated value between N0 and N1, i.e., Ns=N0*(1−s)+N1*s. Similarly the value at the intersection point along V0 and V1 is designated Vt=V0*(1−t)+V1*t, as also shown in 400*b*. Therefore the field value at the intersection point is actually doubly defined as Ns and Vt. In order to resolve this discontinuity, we consider the four planar map partitions of PMP 400*b*, such as partition 421, across the intersection point separately and insert a pair of extra path profile nodes, such as nodes 441 and 442, placed infinitesimally close to each other or coincidentally along the newly formed corners, such as corner 461, of the four planar map section edges. Such infinitesimally close nodes may be coincident or occupy the same space or location.

The two example nodes Ns and Vt of corner 461, referred to as corner nodes, may be coincident, both occupying the same location. Each of the two path segments terminating in one of the pair of corner nodes may also be coincident. Such coincident nodes and path segments form a single region 422 formed by the angle between nodes 471 and 471 and the coincident nodes of corner 461. Locating two or more nodes coincidentally, as used herein, generally refers to locating the two or more nodes at or near the same location or at or near the same point or position in a field.

Figure 5:
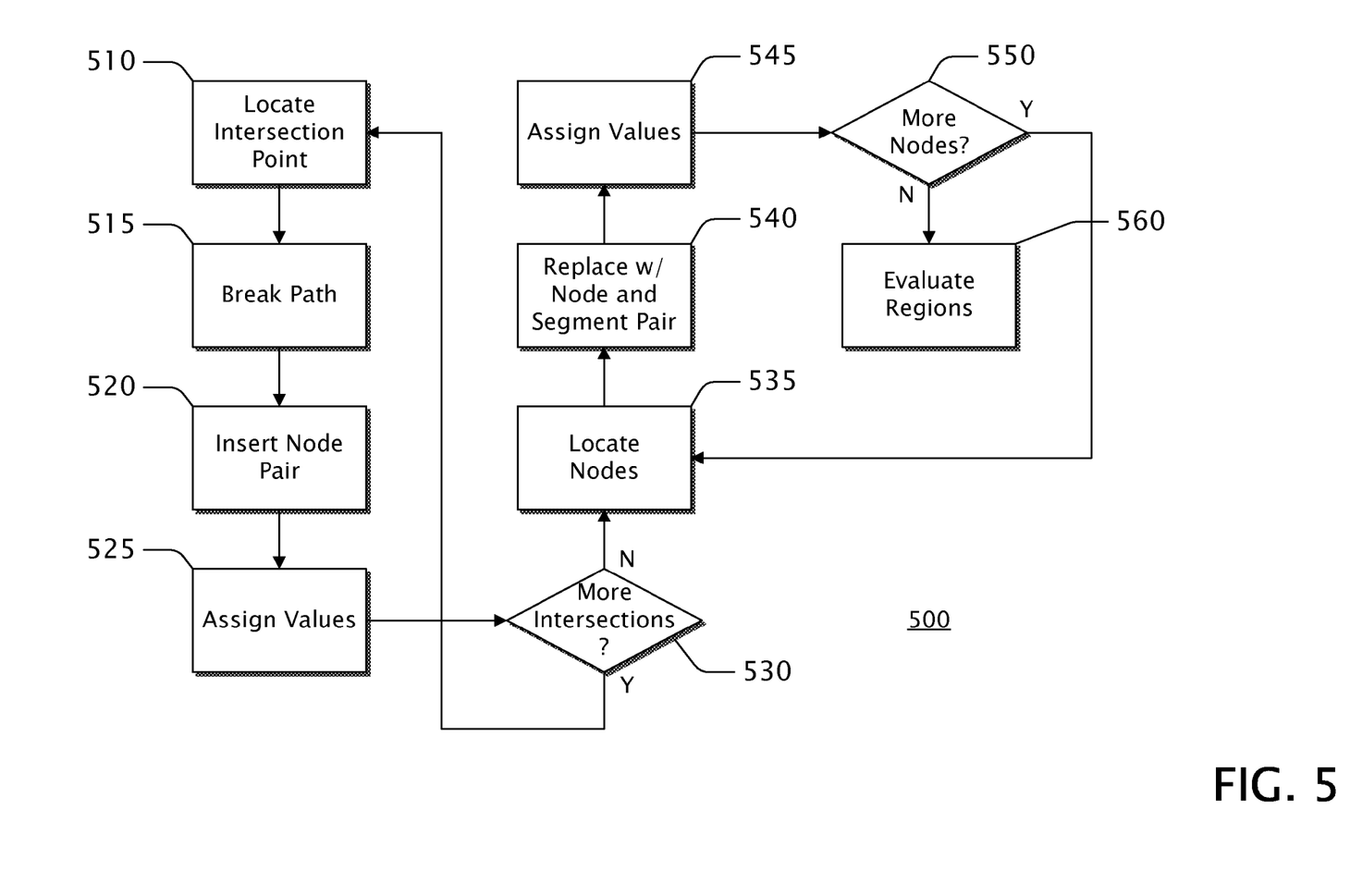
FIG. 5 is a block diagram showing an example method for converting a path profiled based vector graphic object to a planar map profile and evaluating the planar map profile.

FIG. 5 is a block diagram showing an example method 500 for converting a path profiled based vector graphic object to a planar map profile and evaluating the planar map profile. The method includes converting an original path profile to a planar map profile and then evaluating each resultant region. Variations of method 500 and other methods may also be used to convert path profiles into planar map profiles. Alternatively or additionally, a corresponding planar map profile may be generated from a path profile without modification of the path profile.

Block 510 indicates the step of locating a point of intersection on the original path profile. In one example, this is accomplished by identifying a point on the path of the path profile that is intersected by another portion of the path of the path profile. Such a point on the path is a point of intersection. After identification of such a point of intersection, method 500 typically continues at block 515.

Block 515 indicates the step of breaking the path at the point of intersection. In one example, this is accomplished by bisecting the path at the point of intersection. After breaking the path at the point of intersection, method 500 typically continues at block 520.

Block 520 indicates the step of inserting a pair of nodes at the path profile break. In one example, this is accomplished by inserting one node at each of the two newly created endpoints of the broken path of the path profile. Such nodes of a pair are typically coincident. After inserting a pair of nodes, method 500 typically continues at block 525.

Block 525 indicates the step of calculating and assigning values to the pair of inserted nodes. In one example, the values are calculated by extrapolating the field value at the original point of intersection. Such values may be multi-dimensional. The extrapolated values are then assigned to each of the pair of inserted nodes. After calculating and assigning values to the pair of inserted nodes, method 500 typically continues at block 530.

Block 530 indicates the step of determining if the original path profile includes any other intersection points that have not been identified, broken, had nodes inserted and node values assigned. If yes, then method 500 typically continues at block 510. If no, then method 500 typically continues at block 535. At this point (block 535) the original path profile is partially converted to a planar map profile with no points of intersection.

Block 535 indicates the step of locating a node on the partially converted path profile. Such a node may be an inserted node at an original point of intersection, or a node that exists on the original path profile. An end point on a path of a path profile is generally considered to include a node. After locating such a first node, the method 500 includes identifying a second node located at the other end of the path segment extending from the first node. After locating a first node and a second node connected by a path segment, method 500 typically continues at block 540.

Block 540 indicates the step of replacing the nodes and path segment with pairs of nodes and a pair of path segment. In one example, the first node is replaced with a pair of nodes, the second node is replaced with a pair of nodes, and the path segment originally connecting the first and second nodes is replaced with a pair of path segments, each segment of the pair connecting one of the node pair replacing the first node and one of the node pair replacing the second node. Such nodes and path segments of a pair are typically coincident. After the nodes and path segments are replaced with pairs of nodes and path segments, method 500 typically continues at block 545.

Block 545 indicates the step of calculating and assigning values to the pair of replacement nodes. In one example, the values are calculated by duplicating the values of the original node. Such values may be multi-dimensional. The calculated values are then assigned to each of the pair of replacement nodes. After calculating and assigning values to the pair of replacement nodes, method 500 typically continues at block 550.

Block 550 indicates the step of determining if the partially converted path profile includes any other nodes that have not been replaced with a pair of nodes and node values assigned. If yes, then method 500 typically continues at block 535. If no, then method 500 typically continues at block 560. At this point (block 555) the original path profile is converted to a planar map profile without intersections and with planar map partitions or regions. Alternatively, the steps of method 500 may be applied so as to generate a new planar map profile without changing the original path profile as opposed to converting the path profile to a planar map profile.

Block 560 indicates the step of evaluating the planar map portions or regions. In one example, a mean value coordinates evaluation or the like is performed over each region.

Figure 6:
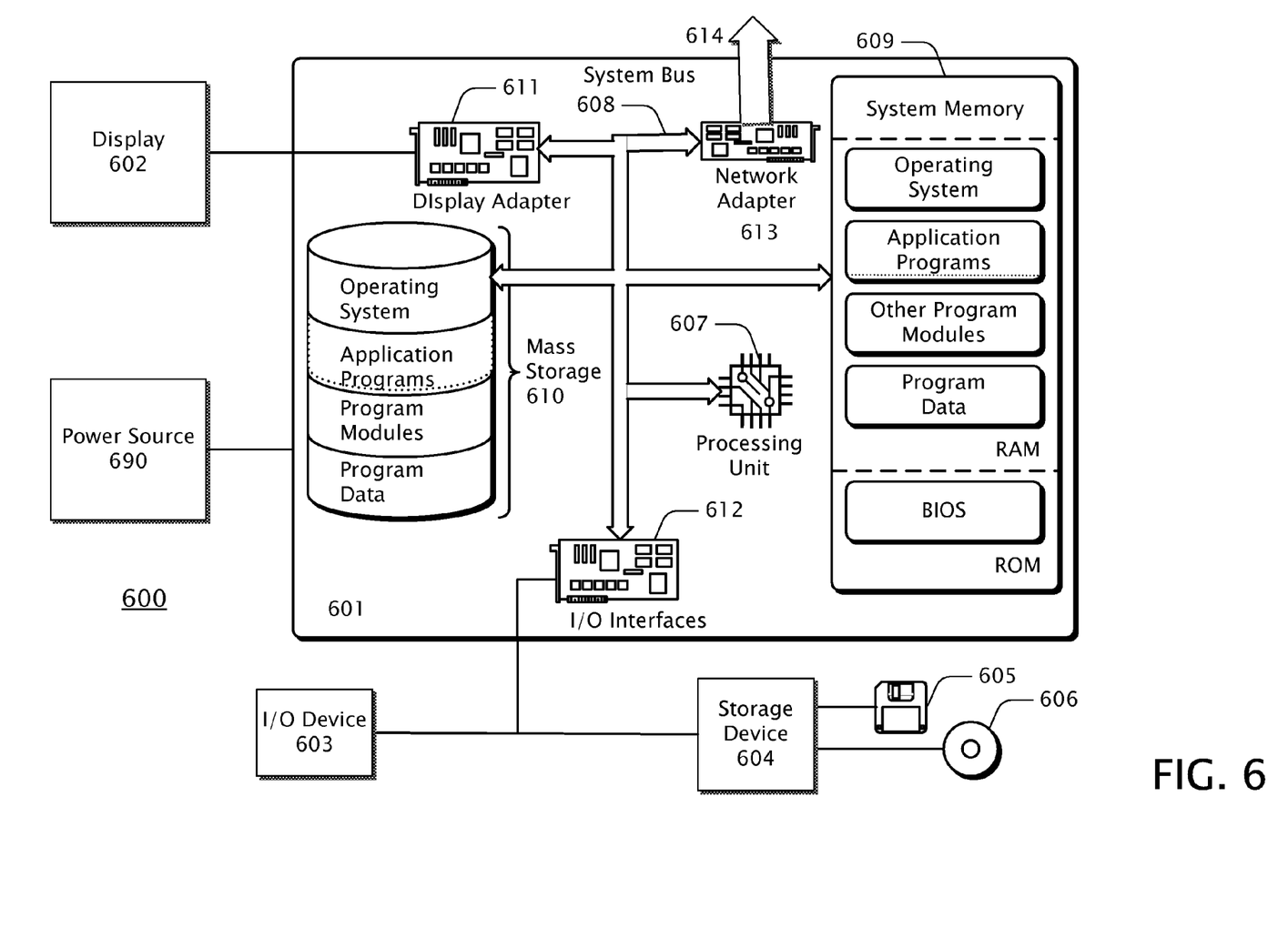
FIG. 6 is a block diagram showing an example computing environment in which the technologies, systems and/or methods described herein may be implemented.

FIG. 6 is a block diagram showing an example computing environment 600 in which the technologies, systems and/or methods described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 600 typically includes a general-purpose computing system in the form of a computing device 601 coupled to various components, such as peripheral devices 602, 603, 604 and the like. System 600 may couple to various other components, such as input devices 603, including voice recognition, touch pads, buttons, keyboards and/or pointing devices, such as a mouse or trackball, via one or more input/output ("I/O") interfaces 612. The components of computing device 601 may include one or more processors (including central processing units ("CPU"), graphics processing units ("GPU"), microprocessors ("µP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include non-volatile RAM, a magnetic disk drive which reads from and/or writes to a removable, non-volatile magnetic disk (e.g., a "floppy disk") 605, and/or an optical disk drive that reads from and/or writes to a non-volatile optical disk such as a CD ROM, DVD ROM 606. Alternatively, a mass storage device, such as hard disk 610, may include non-removable storage medium. Other mass storage devices may include memory cards, memory sticks, tape storage devices, and the like.

Any number of computer programs, files, data structures, and the like may be stored in mass storage 610, other storage devices 604, 605, 606 and system memory 609 (typically limited by available space) including, by way of example and not limitation, operating systems, application programs, data files, directory structures, computer-executable instructions, and the like.

Output components or devices, such as display device 602, may be coupled to computing device 601, typically via an interface such as a display adapter 611. Output device 602 may be a liquid crystal display ("LCD"). Other example output devices may include printers, audio outputs, voice outputs, cathode ray tube ("CRT") displays, tactile devices or other sensory output mechanisms, or the like. Output devices may enable computing device 601 to interact with human operators or other machines, systems, computing environments, or the like. A user may interface with computing environment 600 via any number of different I/O devices 603 such as a touch pad, buttons, keyboard, mouse, joystick, game pad, data port, and the like. These and other I/O devices may be coupled to processor 607 via I/O interfaces 612 which may be coupled to system bus 608, and/or may be coupled by other interfaces and bus structures, such as a parallel port, game port, universal serial bus ("USB"), fire wire, infrared ("IR") port, and the like.

Computing device 601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 690, such as a battery or a power supply, typically provides power for portions or all of computing environment 600. In the case of the computing environment 600 being a mobile device or portable device or the like, power source 690 may be a battery. Alternatively, in the case computing environment 600 is a desktop computer or server or the like, power source 690 may be a power supply designed to connect to an alternating current ("AC") source, such as via a wall outlet.

Some mobile devices may not include many of the components described in connection with FIG. 6. For example, an electronic badge may be comprised of a coil of wire along with a simple processing unit 607 or the like, the coil configured to act as power source 690 when in proximity to a card reader device or the like. Such a coil may also be configure to act as an antenna coupled to the processing unit 607 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 602, I/O device 603, or many of the other components described in connection with FIG. 6. Other mobile devices that may not include many of the components described in connection with FIG. 6, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method for vector field evaluation of a graphics object, the method comprising:
 locating a first node at a first point on a path segment of an original path profile, the original path profile describing at least in part the graphics object;

locating a second node at a second point on the path segment wherein a location of the second point is different than a location of the first point;

replacing the first node at the first point with a pair of first nodes wherein each of the pair of first nodes is distinct from the other and is placed coincidentally at the first point replacing the first node;

replacing the second node at the second point with a pair of second nodes wherein each of the pair of second nodes is distinct from the other and is placed coincidentally at the second point on the path segment replacing the second node; and replacing the path segment between the first point and the second point with a pair of path segments wherein each of the pair of path segments is distinct from the other and is placed coincidentally between the first point and the second point replacing the path segment, and wherein one end of one of the pair of path segments is connected to one of the pair of first nodes and another end of the one of the pair of path segments is connected to one of the pair of second nodes, and wherein one end of another of the pair of path segments is connected to another of the pair of first nodes and another end of the another of the pair of path segments is connected to another of the pair of second nodes, wherein the method is performed by a computer.

2. The method of claim 1 further comprising:
determining a first value for the first node and assigning the first value to each of the pair of first nodes; and
determining a second value for the second node and assigning the second value to each of the pair of second nodes, wherein the first value and the second value represent color attributes at the first point and the second point respectively of the original path profile.

3. The method of claim 2 wherein the first value and the second value are a set of quantities of one or more dimensions.

4. The method of claim 2 further comprising:
identifying a point of intersection on the path segment of the original path profile;
breaking the path segment at the point of intersection resulting in a bisected path segment including a first endpoint and a second endpoint at the point of intersection on the bisected path segment;
inserting a first endpoint node at the first endpoint of the bisected path segment; and
inserting a second endpoint node at the second endpoint of the bisected path segment.

5. The method of claim 4 further comprising calculating a field value for the point of intersection and assigning the field value to the first endpoint node and to the second endpoint node.

6. The method of claim 5 wherein the field value is a set of quantities of one or more dimensions.

7. The method of claim 5 further comprising:
identifying a pair of corner nodes;
identifying a pair of path segments terminating in the pair of corner nodes; and
locating the pair of corner nodes coincidentally.

8. The method of claim 7 further comprising determining a value for one of the pair of corner nodes and assigning the value to each of the pair of corner nodes.

9. The method of claim 8 wherein the original path profile is converted into a planar map profile.

10. The method of claim 9 further comprising evaluating the planar map profile using a Barycentric coordinates construction.

11. The method of claim 10 wherein the Barycentric coordinates construction is a mean value coordinates construction.

12. A method for evaluating a vector graphics object including a path profile with a point of intersection on a path of the path profile, the method comprising:
converting the path profile into a planar map profile so as to eliminate the point of intersection on the path and to form a plurality of planar map partitions, the converting comprising:
replacing a first node located on a first path segment at the point of intersection with a pair of first nodes wherein each of the pair of first nodes is distinct from the other and is placed coincidentally at the point of intersection replacing the first node, wherein each of the pair of first nodes forms a vertex of one of the plurality of planar map partitions, and
replacing a second node located on a second path segment at the point of intersection with a pair of second nodes wherein each of the pair of second nodes is distinct from the other and is placed coincidentally at the point of intersection replacing the second node, wherein each of the pair of second nodes forms a vertex of one of the plurality of planar map partitions, and wherein the method is performed by a computer.

13. The method of claim 12 further comprising:
replacing a node located at a fractional position along the path with two coincident nodes; and
assigning a value of the node to the two coincident nodes.

14. The method of claim 13 wherein the value is a set of quantities of one or more dimensions.

15. The method of claim 12 further comprising separately evaluating each of the planar map partitions using a mean value coordinates construction.

16. A computer-readable medium including computer-executable instructions that, when executed by a processor, cause a computer including the processor to perform a method for evaluating a vector graphics object including of a path profile with a point of intersection on a path of the path profile, the method comprising:
converting the path profile into a planar map profile so as to eliminate the point of intersection on the path and to form a plurality of planar map partitions, the converting including:
replacing a first node located on a first path segment at the point of intersection with a pair of first nodes wherein each of the pair of first nodes is distinct from the other and is placed coincidentally at the point of intersection replacing the first node, wherein each of the pair of first nodes forms a vertex of one of the plurality of planar map partitions,
replacing a second node located on a second path segment at the point of intersection with a pair of second nodes wherein each of the pair of second nodes is distinct from the other and is placed coincidentally at the point of intersection replacing the second node, wherein each of the pair of second nodes forms a vertex of one of the plurality of planar map partitions, and wherein the method is performed by a computer
calculating a field value for the point of intersection;
assigning the field value to the pair of first nodes and to the pair of second nodes; and
separately evaluating each of the plurality of planar map partitions using a mean value coordinates construction.

* * * * *

UNITED STATES PATENT AND TRADEMARK OFFICE
CERTIFICATE OF CORRECTION

| | | |
|---|---|---|
| PATENT NO. | : 7,859,537 B2 | |
| APPLICATION NO. | : 11/626330 | |
| DATED | : December 28, 2010 | |
| INVENTOR(S) | : Siu Chi Hsu | |

It is certified that error appears in the above-identified patent and that said Letters Patent is hereby corrected as shown below:

In column 10, line 10, in Claim 12, delete "comprising:" and insert -- comprising; --, therefor.

Signed and Sealed this
Twenty-sixth Day of July, 2011

David J. Kappos
*Director of the United States Patent and Trademark Office*